United States Patent
Schwartz et al.

(10) Patent No.: US 8,924,119 B2
(45) Date of Patent: Dec. 30, 2014

(54) RETARDING DOWNSHIFT MANAGEMENT

(71) Applicant: Caterpillar Inc., Peoria, IL (US)

(72) Inventors: Timothy D. Schwartz, Washington, IL (US); James Landes, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/790,732

(22) Filed: Mar. 8, 2013

(65) Prior Publication Data
US 2014/0257656 A1  Sep. 11, 2014

(51) Int. Cl.
*B60T 7/12* (2006.01)
*F16H 61/21* (2006.01)

(52) U.S. Cl.
CPC .. *F16H 61/21* (2013.01); *B60T 7/12* (2013.01)
USPC ............. 701/70; 701/50; 701/93; 303/84.1; 303/198; 477/118

(58) Field of Classification Search
USPC ............ 180/170, 315; 701/50, 51, 54, 60–62, 701/65, 70, 75, 78, 81–88; 477/80, 97, 119, 477/120, 121, 186, 900
See application file for complete search history.

(56) References Cited

U.S. PATENT DOCUMENTS

| | | | |
|---|---|---|---|
| 5,303,986 A | 4/1994 | Vandemotter et al. | |
| 5,855,534 A | 1/1999 | Bates | |
| 6,076,622 A * | 6/2000 | Chakraborty et al. | 180/169 |
| 6,249,735 B1 * | 6/2001 | Yamada et al. | 701/65 |
| 6,299,263 B1 * | 10/2001 | Uematsu et al. | 303/192 |
| 6,697,727 B2 * | 2/2004 | Miller et al. | 701/70 |
| 6,819,995 B2 * | 11/2004 | Bellinger | 701/53 |
| 7,120,532 B2 * | 10/2006 | Persson et al. | 701/93 |
| 7,134,985 B2 * | 11/2006 | Watanabe et al. | 477/186 |
| 7,400,961 B2 * | 7/2008 | Rushing et al. | 701/70 |
| 7,739,021 B2 * | 6/2010 | Wegeng et al. | 701/70 |
| 8,401,753 B2 * | 3/2013 | Chappell et al. | 701/65 |
| 8,612,106 B2 * | 12/2013 | Mitchell et al. | 701/58 |
| 8,708,072 B2 * | 4/2014 | Montocchio et al. | 180/65.275 |
| 2002/0152014 A1 * | 10/2002 | Miller et al. | 701/70 |
| 2007/0099759 A1 * | 5/2007 | Jamzadeh | 477/186 |
| 2008/0071453 A1 * | 3/2008 | Nakanishi et al. | 701/70 |
| 2008/0172162 A1 * | 7/2008 | Wegeng et al. | 701/70 |
| 2009/0318263 A1 * | 12/2009 | Yuet et al. | 477/92 |
| 2011/0125376 A1 | 5/2011 | Chappell et al. | |
| 2012/0123651 A1 * | 5/2012 | Johansson et al. | 701/51 |
| 2012/0205169 A1 * | 8/2012 | Montocchio et al. | 180/54.1 |

FOREIGN PATENT DOCUMENTS

JP      08298703      11/1996

* cited by examiner

*Primary Examiner* — Thomas Tarcza
*Assistant Examiner* — Tyler J Lee
(74) *Attorney, Agent, or Firm* — Miller, Matthias & Hull

(57) ABSTRACT

A retarding unit in a vehicle is automatically controlled based on conditions including a current setting of the retarding control, downhill grade, speed, current gear, and impending gear change. With the retarder control set in the high position, when the vehicle is operating at a downhill angle greater than the low angle threshold and less than the high angle threshold, and the pending gear is a large step downshift, automatically setting a retarder level to a low retarder level. When the vehicle is operating on level ground and the pending gear is a large step downshift or the current gear is first or second gear, automatically setting the retarder level to off. When the vehicle is operating on flat ground and the deceleration is above a trigger level, automatically setting the retarder level to a low retarder level.

18 Claims, 4 Drawing Sheets

RETARDING DOWNSHIFT MANAGEMENT

TECHNICAL FIELD

The present disclosure relates to a propulsion system for a large vehicle and more particularly to management of a retarding unit during vehicle operation.

BACKGROUND

Heavy equipment, such as large earthmoving vehicles, can use a retarder to supplement the braking provided by conventional brakes. Retarder operation is based on a manual setting and is either on or off. Some types of retarder have various level settings. When on, the retarder is active in all driving conditions including slowing to a stop by downshifting through low gears. In this, and some other conditions, the retarder may cause a rough downshift, which at a minimum is uncomfortable for the operator and at worst, may cause undue wear on drivetrain components.

U.S. Patent Publication No. 20110125376 ("the '376 publication") describes an automatic downhill speed control system in a machine. The published application describes a retarder control for slowing the machine. The retarder can be set to an automatic position. When the retarder is in the automatic mode, the controller will determine the grade of path. Based on the grade and the vehicle speed, the gear will be changed automatically as per a predetermined gear selection sequence. When the vehicle is moving on the flat ground the automatic control is deactivated. The '376 publication fails to disclose automatically disengaging or changing the retarding level based on an analysis of the speed, grade, and/or impending gear change.

SUMMARY OF THE DISCLOSURE

In a first aspect, a method of managing retarding in a vehicle using a retarder controller having a processor, a physical memory, and inputs coupled to respective vehicle sensors includes determining, via the processor using data received at one or more of the inputs, a requested retarder level, an angle of the vehicle, and a current gear of the vehicle, and automatically setting a retarder level based on the requested retarder level, the angle of the vehicle, and the current gear of the vehicle.

In another aspect, a retarder controller that manages operation of a retarder in a vehicle includes a processor, an operator input, coupled to the processor, that receives a signal of a requested operating level of the retarder, a grade input, coupled to the processor, that receives a first signal indicating an angle of the vehicle from a grade sensor, and a transmission input, coupled to the processor, that receives at least one of a current gear, a vehicle speed, and a pending gear. The retarder controller may also include a memory, coupled to the processor, containing computer-executable instructions that are executed on the processor to cause the retarder controller to determine that the requested setting of the retarder designates an on setting, determine a grade angle of the vehicle, and determine the current gear, operate the retarder at the requested setting when the current gear is above a predetermined gear. When the requested setting is high, to change the retarder setting to low when i) a downhill grade is between a low angle threshold and a high angle threshold and ii) a large step downshift is pending.

In yet another aspect, a method of managing retarding in a vehicle includes determining a requested retarder level, a deceleration of the vehicle, a front-to-back angle of the vehicle, a current gear of the vehicle, and a pending gear of the vehicle. The method may also include providing a low angle threshold and a high angle threshold for an angle of the vehicle, the high angle threshold greater than the low angle threshold and when the vehicle is operating at a downhill angle greater than the low angle threshold and less than the high angle threshold, and the pending gear is a large step downshift, automatically setting a retarder level to a low retarder level. The method may continue so that when the vehicle is operating at a downhill angle less than the low angle threshold and the pending gear is a large step downshift, automatically setting the retarder level to off. The method may further continue so that when the vehicle is operating at a downhill angle less than the low angle threshold, and the current gear is one of first gear or second gear, automatically setting the retarder level to off and when the vehicle is operating at a downhill angle less than the low angle threshold and the deceleration is above a trigger level, automatically setting the retarder level to a low retarder level.

DETAILED DESCRIPTION

Figure 1:
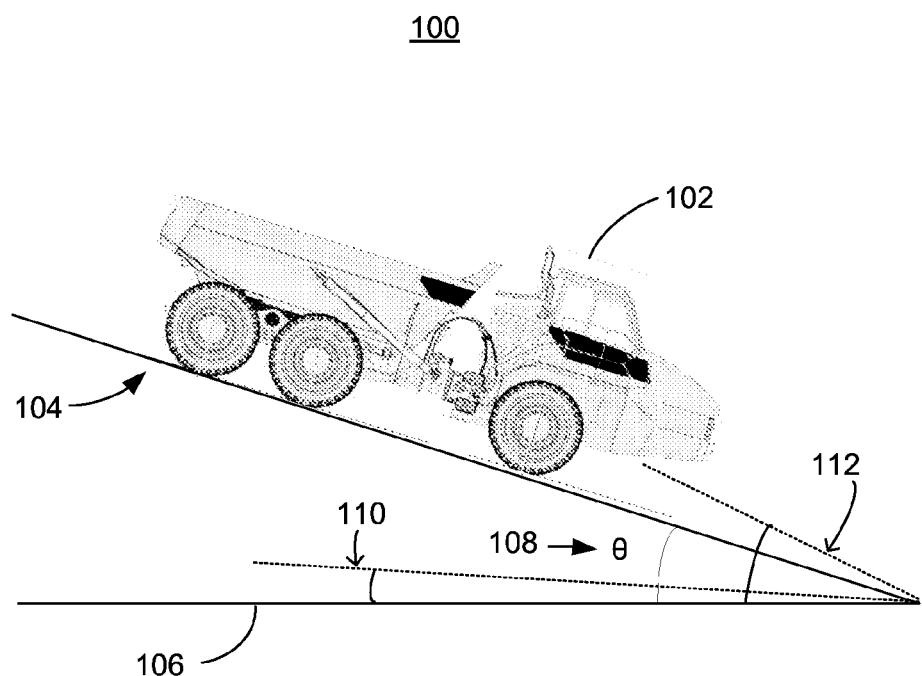
FIG. 1 illustrates a vehicle operating on a grade.

FIG. 1 illustrates a worksite 100 with a vehicle 102 positioned in a downhill attitude on an incline 104. The incline 104 may be at an angle θ 108 measured from the horizontal 106. For the purpose of the following discussion, a low angle threshold 110 and a high angle threshold 112 are also depicted in FIG. 1.

Figure 2:
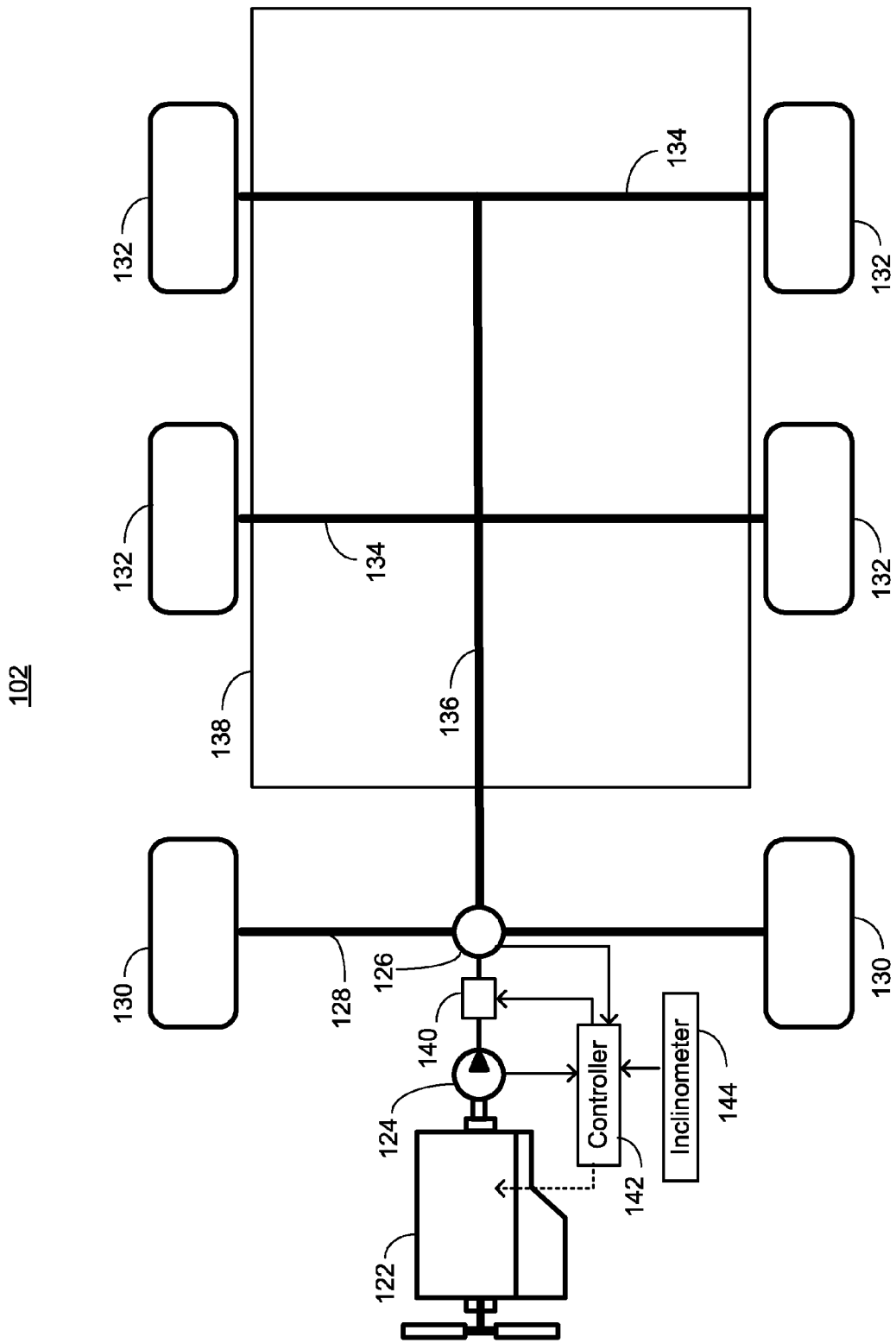
FIG. 2 is a block diagram of the vehicle of FIG. 1 illustrating elements relevant to retarding downshift management.

FIG. 2 is a highly simplified block diagram of the vehicle 102 illustrated in FIG. 1. In this exemplary embodiment, the vehicle 102 is shown as having an engine 122, a torque converter 124, and a transmission 126 that drives an axle 128 and front drive wheels 130. Additional drive wheels 132 may be connected by axles 134 and driven via a driveshaft 136. In practice, the drivetrain may be significantly more complex and may include inter-axle differentials and cross-axle differentials to improve traction, which are beyond the scope of the current disclosure. In an embodiment, a payload may be carried in a payload box 138. Other vehicle or machine types may have different drivetrain and drive wheel configurations that are equally applicable to retarding downshift management.

The vehicle 102 may also include a retarder 140. The retarder 140 may be managed by a controller 142. The controller 142 may receive inputs from the torque converter 124, the transmission 126, and an instrument capable of reporting an angle of the vehicle, such as an accelerometer or an inclinometer 144. The controller 142 may also receive a signal from an operator station (not depicted). The signal may reflect an operator selection of a setting for the retarder 140. In an embodiment, however, the operator requested selection is an input to the controller 142. The requested selection is considered along with other inputs when determining an actual retarder level setting.

The retarder 140 illustrated in FIG. 2 is representative of one of several kinds of retarder that may be used in different kinds of equipment. In diesel engines, a compression release brake may provide retarding function through control of cylinder exhaust valves. In another embodiment, an exhaust brake may simply restrict an exhaust pipe of a vehicle and raise pressure in the exhaust system to lower power at the transmission 126. More conventionally, a hydraulic retarder may use veins in a static chamber filled with varying amounts of fluid to create a viscous drag in the drivetrain. In other embodiments, an electric retarder coupled to the drivetrain may use opposing magnetic fields in a motor-type assembly to provide supplemental braking.

In the illustrated embodiment, an operator may be able to request a certain retarder level setting, for the sake of illustration, "off," "low," and "high." Often an operator may leave the retarder at a high setting because it is simply more convenient to experience the effects of an unnecessarily high retarder setting than it is to routinely change the setting through various portions of a work cycle. As discussed in more detail below, the requested setting may be overridden in certain cases at least to provide a better driving experience and perhaps to also reduce wear and tear on the vehicle 102.

Figure 3:
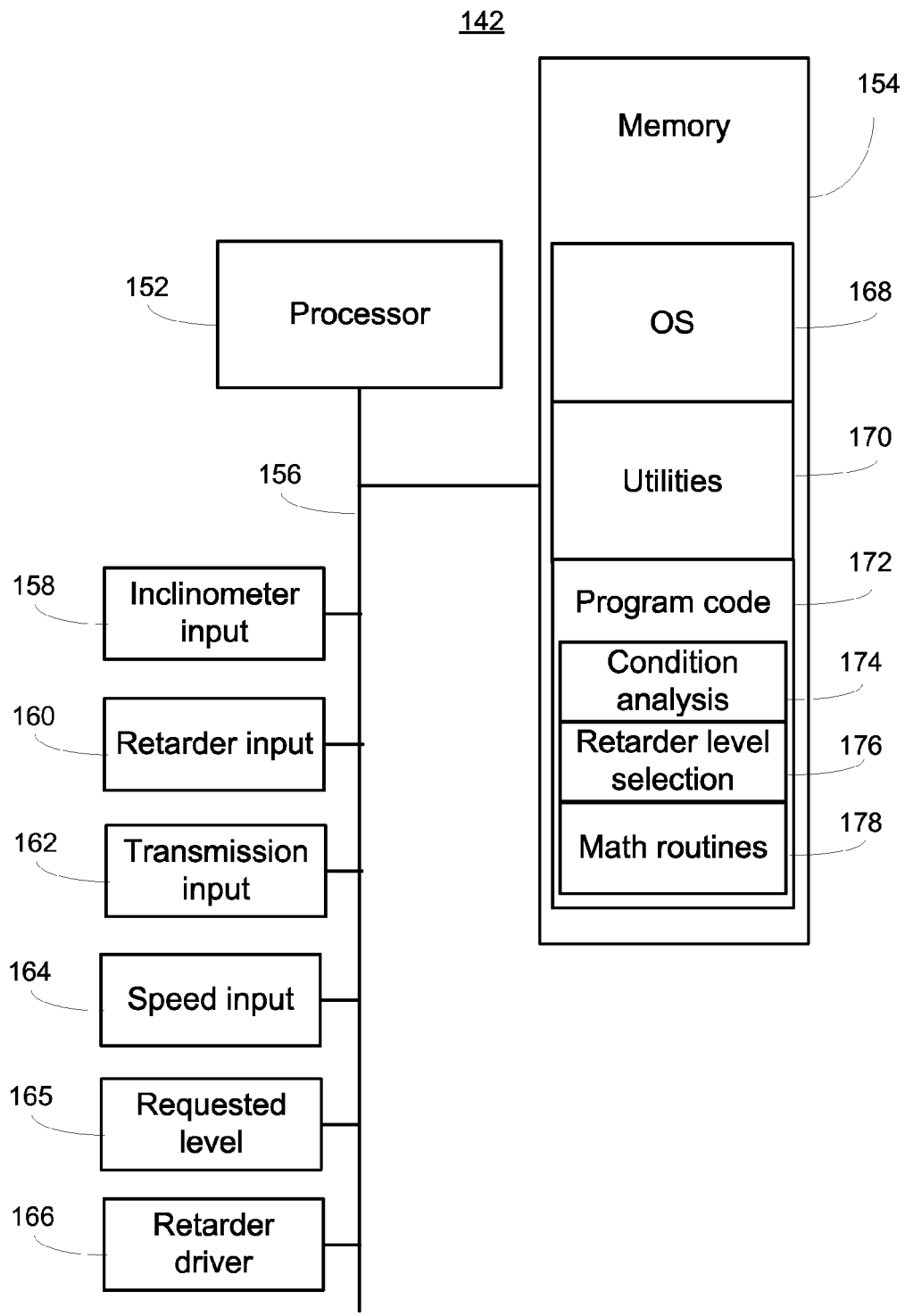
FIG. 3 is a block diagram of a controller usable in retarding downshift management.

FIG. 3 is a block diagram of the controller 142 of FIG. 2, usable in retarding downshift management. The controller 142 may include a processor 152 and a memory 154, connected via a bus 156. The bus 156 may also connect the processor 152 to a number of inputs and outputs. The inputs may include an inclinometer input 158, a retarder input 160, a transmission input 162, and a speed input 164. In some embodiments, the transmission input 162 may receive data used to derive speed, so that no separate speed input 164 is required. In other embodiments, the speed may be based on a signal from a separate ground speed sensor (not depicted). An operator requested level input 165 may receive a setting of requested retarder level from the cab or operator station.

The controller 142 may have a retarder driver 166 used to set the actual operating level of the retarder 140 via an electric or mechanical interface (not depicted). The controller 142 may have other outputs such as a signal for an indicator light showing an actual retarder level.

In other embodiments, other techniques may be used to collect and deliver data used by the controller 142, such as a multiplexed data bus connection to an engine and/or transmission computer (not depicted).

The memory 154 may be a physical memory including volatile and/or nonvolatile physical memory including but not limited to RAM, ROM, programmable arrays, flash memory, etc. The controller 142 may include an operating system 168, such as a real-time operating system (RTOS) or other known operating system, and utilities 170 that may support routine functions such as communication and diagnostics.

The memory 154 may also include program code 172 that may be used to implement retarder management. The program code 172 may include a module to perform an analysis of current conditions 174, a module that determines an appropriate retarder level selection 176, and various mathematical routines 178.

The controller 142 may be a standalone unit as depicted, or may be included as a function in a different physical computer-oriented processor or engine controller (not depicted). Other embodiments of a standalone controller, the actual functions may be implemented in a different manner, such as a field programmable gate array (FPGA), proportional controller, or may use different specific subsystem combinations that achieve a functional equivalent.

INDUSTRIAL APPLICABILITY

The ability to provide automatic, condition-oriented setting of a retarder addresses issues associated with maintaining a retarder setting that may be inappropriate for the current environment. Analyzing a combination of speed, gear setting, downhill angle, and pending gear change allows the vehicle 102 to provide an operator with a comfortable ride when the retarder is not needed while maintaining the extra braking provided by the retarder when conditions warrant its use. Because the operator does not need to make a choice between constant changes in retarder level setting and comfort while slowing or in low gears, the operator may be able to focus more attention on the worksite environment resulting, in some cases, in improved safety and work cycle efficiency, as well as the operator's own comfort.

Figure 4:
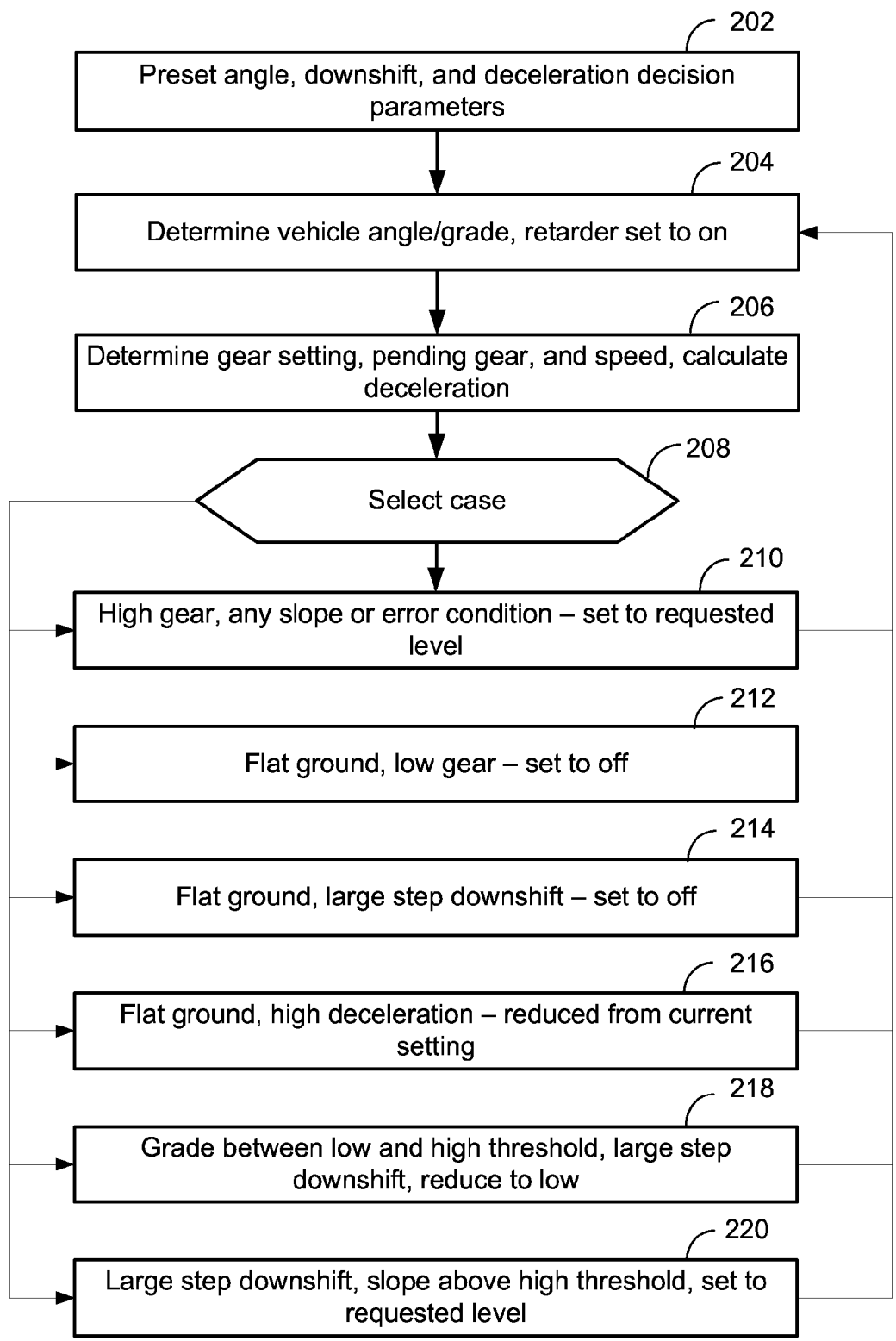
FIG. 4 is a flow chart of an exemplary method of retarding downshift management.

FIG. 4 is a flow chart of an exemplary method 200 of retarding downshift management. At block 202, a number of parameters may be disposed in the vehicle 102, and more specifically, in the controller 142. These parameters may include preset angles, downshift classifications, gear and speed parameters, and deceleration levels. These parameters may be vehicle specific and may be stored in the memory 154. The parameters may be changeable in the field to accommodate site-specific conditions or operator-specific preferences.

The preset angles may be used to determine trigger points for categorizing operation of the vehicle 102 as on flat ground, a modest incline, or a steep incline. For example, in an embodiment, flat ground may be considered any terrain less than a range of 2.5% to 5% grade. In one embodiment, a low angle threshold may be about a 4% grade, or around 2.3°. As discussed more below, the vehicle angle with respect to horizontal is a determining factor for some retarder settings. In order to define flat ground for this purpose, the low angle threshold may include some slight uphill angles, but in general, the retarder is not used when traveling uphill. A high angle threshold may be set in a range of 23% to 27% grade. In an embodiment, the high angle threshold may be a 25% grade or an angle of about 14.5°.

Downshift classifications may include those downshifts that are considered a large step. For example, in some vehicles only a downshift from gear 2 to gear 1 may be considered a large step. In other vehicles, other downshift combinations may also be considered as a large step for classification purposes, as discussed in more detail below. For example, a gear 3 to gear 2 downshift may be considered a large downshift in other vehicles. Also, a multiple gear downshift may be considered a large step downshift, for example, gear 4 or 5 to gear 2, or gear 4 to gear 1. The transmission 126 or a transmission controller (not depicted) may report a pending downshift to the controller 142.

Gear classification may include identification of a gear at or above which no changes in operator requested retarder level are made. In some vehicles, gear 3 may be considered a high gear while in other vehicles gear 4 or even a higher gear may be the cutoff for retarder adjustment. In conjunction with identification of a high gear, when groundspeed is available, a speed threshold may also be used to cutoff retarder adjustment. In an embodiment, no adjustments to the operator-selected retarder setting are made when the groundspeed is above a range of 18-25 kilometers per hour on flat ground.

A high deceleration threshold may be determined for use when deciding if retarder operation should be maintained or if the deceleration is too high and the retarder level should be reduced.

At block 204, the module 174 may make a determination of the vehicle's angle. More specifically, it may be determined at what angle the vehicle 102 is traveling and, if so, whether the incline 104 would be considered flat, moderate, or steep based on the low angle threshold and the high angle threshold discussed above. Additionally, the operator requested retarder setting must be set to one of the on positions.

At block 206, the module 174 may further determine other operating conditions of the vehicle 102. Using information received from the drivetrain or other sensors, a gear setting, a pending gear, and speed may be determined. Deceleration may also be determined either as a direct input or based on a change in speed over a period of time.

At block 208, the retarder level selection module 176 may make a selection of a retarder level using vehicle angle and the other vehicle data. Table 1 illustrates a summary of an exemplary selection criteria.

TABLE 1

| Gear | Slope | Retarder level |
|---|---|---|
| High gear or error | Any | Per setting |
| Large step downshift | Flat ground | Off |
| Low gear | Flat ground | Off |
| High groundspeed | Flat ground | Per setting |
| High deceleration | Flat ground | Reduced |
| Large step downshift | Low thresh. < Current < High thresh. | Reduced to low |
| Large step downshift | >High threshold | Per setting |

Referring to Table 1 and as illustrated by blocks 210-220 in FIG. 4, various cases for retarder level setting may be selected based on the vehicle conditions. Table 1 is illustrative and does not attempt to address every possible combination of inputs and corresponding retarder level settings. At block 210, if the vehicle 102 is operating at or above the high gear threshold, for example, in gear 4, the controller 142 may set the retarder level to the operator requested retarder level. In the event that one or more of the required inputs is either unavailable or out of range, or another error occurs, the operator's requested level may be used.

At block 212, if the vehicle 102 is operating on flat ground, that is, below the low angle threshold, and vehicle 102 is operating in a low gear as defined at block 206, the retarder may be set to off.

At block 214, if the vehicle 102 is operating on flat ground, that is, below the low angle threshold, and a large step downshift is pending the retarder may be set to off.

At block 216, if the vehicle 102 is decelerating above the deceleration threshold set at block 206, the retarder level may be reduced, for example, from a high setting to a low setting to reduce the amount of braking supplied by the retarder 140. In other embodiments, the retarder level may be reduced from high to medium or from a low setting to off during this condition.

At block 218, if a large step downshift, as defined above, is pending and the vehicle is operating on a moderate incline defined as being above the low angle threshold and below the high angle threshold, the retarder level may be maintained at low or reduced to low.

At block 220, if a large step downshift is pending and the vehicle 102 is operating on a steep grade, that is, above the high angle threshold the retarder level may be set to the current operator requested level.

The above embodiments generally assume a two level retarder, however, the technique of the reducing retarder level or setting it to off based on operating conditions is easily applicable to retarders having more than two levels.

What is claimed is:

1. A method of managing retarding in a vehicle using a retarder controller having a processor, a physical memory, and inputs coupled to respective vehicle sensors, the method comprising:

determining, via the processor using data received at one or more of the inputs, a requested retarder level, an angle of the vehicle, and a current gear of the vehicle; and automatically setting a retarder level based on the requested retarder level, the angle of the vehicle, and the current gear of the vehicle.

2. The method of claim 1, when the current gear is above a threshold gear, automatically setting the retarder level to the requested retarder level.

3. The method of claim 1, further comprising:
predetermining a low angle threshold and a high angle threshold for the angle of the vehicle, the high angle threshold greater than the low angle threshold; and
when the vehicle is operating at a downhill angle greater than the high angle threshold, automatically setting the retarder level to the requested retarder level.

4. The method of claim 1, further comprising:
predetermining a low angle threshold and a high angle threshold for the angle of the vehicle, the high angle threshold greater than the low angle threshold; and
when the vehicle is operating at a downhill angle greater than the low angle threshold and less than the high angle threshold, automatically setting the retarder level to a low retarder level.

5. The method of claim 1, further comprising:
predetermining a low angle threshold and a high angle threshold for the angle of the vehicle, the high angle threshold greater than the low angle threshold; and
when the vehicle is operating at a downhill angle less than the low angle threshold, automatically setting the retarder level to off.

6. The method of claim 1, further comprising:
predetermining a low angle threshold and a high angle threshold for the angle of the vehicle, the high angle threshold greater than the low angle threshold; and
when the vehicle is operating at a downhill angle less than the low angle threshold, and the deceleration is above a trigger level, automatically setting the retarder level to a low retarder level.

7. The method of claim 3, further comprising: predetermining a low angle threshold and a high angle threshold for the angle of the vehicle, the high angle threshold greater than the low angle threshold; and when the vehicle is operating at a downhill angle less than the low angle threshold, and the current gear is at or below a threshold gear, automatically setting the retarder level to off.

8. The method of claim 1, further comprising determining a groundspeed of the vehicle, wherein automatically setting the retarder level is further based on the vehicle groundspeed.

9. A retarder controller that manages operation of a retarder in a vehicle, the retarder controller comprising:
a processor;
an operator input, coupled to the processor, that receives a signal of a requested operating level of the retarder;
a grade input, coupled to the processor, that receives a first signal indicating an angle of the vehicle from a grade sensor;
a transmission input, coupled to the processor, that receives at least one of a current gear, and a vehicle speed; and
a memory, coupled to the processor, containing computer-executable instructions that are executed on the processor to cause the retarder controller to:
determine that the requested setting of the retarder designates an on setting;
determine a grade angle of the vehicle;
determine the current gear;

operate the retarder at the requested setting when the current gear is above a predetermined gear; and when the requested setting is high, change the retarder setting to low when a downhill grade is between a low angle threshold and a high angle threshold.

10. The retarder controller of claim 9, wherein the memory has further computer-executable instructions that are executed on the processor to cause the retarder controller to turn off the retarder when the downhill grade is less than the low angle threshold.

11. The retarder controller of claim 9, wherein the memory has further computer-executable instructions that are executed on the processor to cause the retarder controller to turn the retarder off when operating in a low gear and the downhill grade is less than the low angle threshold.

12. The retarder controller of claim 9, wherein the memory has further computer-executable instructions that are executed on the processor to cause the retarder controller to retain the requested setting when the downhill grade is greater than the high angle threshold.

13. The retarder controller of claim 9, wherein the memory has further computer-executable instructions that are executed on the processor to cause the retarder controller to set the retarder at a reduced setting during high deceleration when the downhill grade is less than the low angle threshold.

14. The retarder controller of claim 9, wherein the memory has further computer-executable instructions that are executed on the processor to cause the retarder controller to:
 turn off the retarder when operating in a low gear and the downhill grade is less than the low angle threshold;
 retain the requested setting when the downhill grade is greater than the high angle threshold; and
 set the retarder at low during high deceleration when the downhill grade is less than the low angle threshold.

15. A method of managing retarding in a vehicle comprising:
 determining a requested retarder level, a deceleration of the vehicle, a front-to-back angle of the vehicle, and a current gear of the vehicle;
 providing a low angle threshold and a high angle threshold for an angle of the vehicle, the high angle threshold greater than the low angle threshold;
 automatically setting a retarder level to a low retarder level only when the vehicle is operating at a downhill angle greater than the low angle threshold and less than the high angle threshold;
 automatically setting the retarder level to off only when the vehicle is operating at a downhill angle less than the low angle threshold;
 automatically setting the retarder level to off only when the vehicle is operating at a downhill angle less than the low angle threshold, and the current gear is one of first gear or second gear; and
 automatically setting the retarder level to a low retarder level only when the vehicle is operating at a downhill angle less than the low angle threshold and the deceleration is above a trigger level.

16. The method of claim 15, further comprising:
 when the current gear is above third gear, automatically setting the retarder level to the requested retarder level; and
 when the current gear is third gear or less and the downhill angle is greater than the high angle threshold, automatically setting the retarder level to the requested retarder level.

17. The method of claim 15, wherein the low angle threshold is about 2.3 degrees and the high angle threshold is about 14.5 degrees.

18. The method of claim 15, further comprising:
 determining a groundspeed of the vehicle; and
 when the vehicle is operating above a threshold groundspeed and at a downhill angle less than the low angle threshold, disabling automatic adjustments to the retarder level.

* * * * *